United States Patent [19]

Herbst et al.

[11] Patent Number: 5,789,470
[45] Date of Patent: Aug. 4, 1998

[54] STABILIZED RECYCLED PLASTICS

[75] Inventors: Heinz Herbst, Lautertal; Kurt Hoffmann, Wachenheim, both of Germany; Franca Masina, Anzola Emilia, Italy; Rudolf Pfaendner, Rimbach, Germany; Franciszek Sitek, Therwil, Switzerland

[73] Assignee: Ciba Specialty Chemicals Corporation, Tarrytown, N.Y.

[21] Appl. No.: 809,477

[22] PCT Filed: Sep. 15, 1995

[86] PCT No.: PCT/EP95/03628

§ 371 Date: Mar. 20, 1997

§ 102(e) Date: Mar. 20, 1997

[87] PCT Pub. No.: WO96/09341

PCT Pub. Date: Mar. 28, 1996

[30] Foreign Application Priority Data

Sep. 23, 1994 [CH] Switzerland ............ 2908/94-9

[51] Int. Cl.$^6$ .................. C08K 5/34; C08K 3/18; C08K 3/22
[52] U.S. Cl. ............ 524/100; 524/94; 524/98; 524/102; 524/424; 524/430; 252/400.2; 252/403
[58] Field of Search ............ 524/94, 98, 100, 524/102, 424, 430; 252/400.2, 403

[56] References Cited

U.S. PATENT DOCUMENTS

| 4,442,250 | 4/1984 | Cantatore | 524/98 |
| 5,004,759 | 4/1991 | Muttterer et al. | 524/89 |
| 5,198,546 | 3/1993 | Borzatta et al. | |
| 5,298,540 | 3/1994 | Pauquet et al. | 524/94 |

FOREIGN PATENT DOCUMENTS

| 0446171 | 9/1991 | European Pat. Off. |
| 9407946 | 4/1994 | WIPO |
| 9407950 | 4/1994 | WIPO |
| 9407951 | 4/1994 | WIPO |

OTHER PUBLICATIONS

Derw. Abst. 91-269006.

*Primary Examiner*—Kriellion S. Morgan
*Attorney, Agent, or Firm*—Luther A. R. Hall; Victoria M. Malia

[57] ABSTRACT

The invention relates to stabilized recycled plastics, which can be obtained from domestic, commercial and industrial waste or valuable material collections, comprising a macrocyclic compounds containing a radical of formula (I) or (II), in the macrocycle or in a side group of the macrocycle, where the macrocycle comprises at least 8 atoms and in which the substituents R, independently of one another, are methyl, ethyl or propyl, or two radicals R on the same carbon atom are, together, a pentamethylene radical, and a is the number 0, 1 or 2. The invention also relates to a process for the stabilization of recycled plastics and to the use of the above macrocyclic compounds as stabilizer.

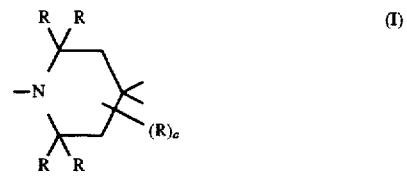

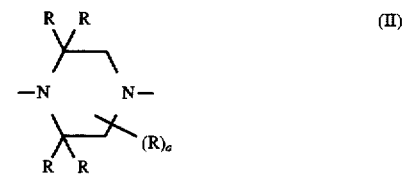

14 Claims, No Drawings

STABILIZED RECYCLED PLASTICS

The invention relates to stabilized recycled plastics, as predominantly produced in the household, in commerce and also in industry and in valuable material collections, and to a stabilization process and to the use of a stabilizer.

The recycling of waste is a task of increasing importance for ecological reasons. The recycling of paper, textiles, glass or metals is already carried out on a large scale, whether by separate collection or by sorting of the refuse. The recycling of plastic waste and used plastics is also an increasing aim. Thermoplastics are generally processed by re-melting.

The plastic waste produced in the household, in commerce or in industry or the valuable plastic materials or used plastics obtained from collections or a return obligation, for example in specific sectors of industry, such as the automobile industry, electrical industry, agriculture or the packaging industry, predominantly comprises thermoplastics based on polyolefins, styrene polymers, polyvinyl chloride or polyesters.

These used plastics, which may constitute valuable raw materials, can be obtained either as a single type or as a mixture. Single-type plastic waste can be generated directly during production of plastic parts or obtained by separate collections or sorting.

On the other hand, the recycling of used plastic frequently means the use of a mixture of different types of plastic. Known industrial separation methods, for example hydrocyclone separation, mostly give only moderately clean fractions of various plastic mixtures, for example a polyolefin mixture.

The post-stabilization of recycled plastics is disclosed, for example, in WO 94/07946, WO 94/07950 and WO 94/07951. The main proposal here is to use compounds from the group consisting of the phosphites and/or sterically hindered phenols.

For the stabilization of recycled high-density polyethylene, P. Vink, R. T. Rotteveel and J. D. M. Wisse in Polymer Degr. and Stability, Issue 9, p.133 (1984) studied various stabilizers from the classes of the phosphites, hindered phenols, benzotriazoles, hindered amines and phosphonites.

These authors also indicated that the recyclates must be re-stabilized. Although the plastics have mostly been treated originally with stabilizers against thermooxidative and in some cases also against photooxidative degradation, these stabilizers are lost during use of the plastics, during storage of the waste and during processing of the recyclates, in some cases due to migration, extraction or by degradation. In addition, a recycled plastic generally differs structurally and also chemically from a new plastic as a consequence of the prior use or due to storage and processing; for example, initiator points (hydroperoxides, carbonyl groups etc.) for oxidative attack may already have formed due to oxidation. An additional adverse effect on the ageing behaviour can be due to foreign substances, for example paper or adhesives. These foreign substances can also originate from contact with diverse substances during use or processing, for example paint components, printing inks, wood, traces of metal, initiator residues or traces of water. A recycled plastic therefore requires, for example, a relatively large amount of stabilizers or alternatively stabilizers which take into account these particular circumstances. The difficulty of finding suitable stabilizers is due to the specific type of previous damage/impurities, which may have taken place over an extended period.

The stabilization of a plastic mixture is also a difficult task, since each type of plastic makes specific requirements of the stabilizers. Thus, for example, completely different stabilizers are used for vinyl chloride polymers than for polyolefins or styrene polymers.

Owing to previous damage and impurities, recyclates also have a modified solution behaviour vis-à-vis additives. For example, an increase in the concentration of polar additives through dissolution in polar components can be expected, which adversely affects the ageing stability as a whole and means that a complex additive mixture would be required for good recyclate stability.

It would therefore be necessary to add a mixture of various stabilizers in order to stabilize a plastic mixture. In the case of complex plastic mixtures, this is a complicated method.

Worthwhile recycling is also possible, in particular, if the recyclates can be used in relatively high-quality applications. Examples of relatively high-quality applications are those which are intended to withstand outside use for a long period (such as refuse containers, pallets, garden furniture, pipes, containers, automobile parts, housing parts, etc.).

It is therefore a particular object of the present invention to provide a stabilized recycled plastic which has improved long-term behaviour and improved weathering properties. The additive used for this purpose should have the simplest possible composition and should be universally usable without slight variations, as are usual in recyclates from collections, requiring a modification of the stabilization, as can easily be necessary when a complex mixture is used.

It has now been found that both single-type and mixed recycled plastics can, in the presence of certain macrocyclic compounds containing piperidinyl or piperazinyl groups, be stabilized simply and economically against thermal, oxidative and/or actinic degradation during processing and subsequent use.

The invention thus relates to stabilized recycled plastics, which can be obtained from domestic, commercial and industrial waste or valuable material collections, comprising from 0.01 to 5% by weight, based on the plastic, of at least one macrocyclic compound containing a radical of the formula

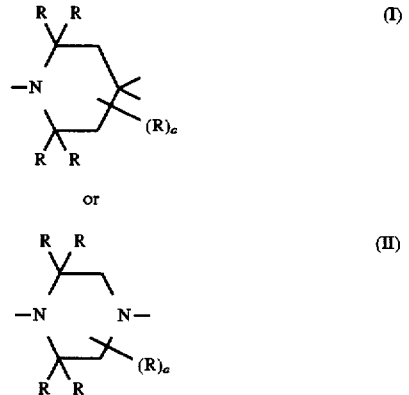

in the macrocycle or in a side group of the macrocycle, where the macrocycle comprises at least 8 atoms and in which the substituents R, independently of one another, are methyl, ethyl or propyl, preferably methyl, or two radicals R on the same carbon atom are, together, a pentamethylene radical, and a is the number 0, 1 or 2, preferably 0.

Preference is given to macrocyclic compounds in which the macrocycle comprises at least 9 atoms and very particular preference is given to those comprising from 9 to 50 atoms in the macrocycle.

From 0.05 to 2% by weight, in particular from 0.1 to 1% by weight, based on the plastic, of the above macrocyclic compound is preferably used.

The recycled plastics are predominantly thermoplastic polymers or mixtures/blends. Examples of predominantly thermoplastic polymers or mixtures/blends are those whose thermoplastic content is greater than 95% by weight, preferably greater than 97% by weight.

The plastics to be stabilized are, for example, used plastics from households and commerce (for example supermarkets), which predominantly originate from packaging materials. These can be, for example, films, bags, bottles and other containers or foams. Other materials may also be present. However, it is also possible for the above-described single-type plastics which have been previously damaged by use, storage or processing to be stabilized. The materials originate, for example, from separation/sorting or from specific areas of industry or return obligations, for example from the automobile industry, electrical/electronic industry, construction, agriculture and the textile industry.

Single-type plastics which have been previously damaged during processing are, for example, those produced on conversion of a plastic powder or granular commercial product into an end product. A recyclate can also be formed from production waste, for example the sprues, edge trimmings and faulty batches.

The invention relates to single-type, recycled plastics, for example from the polymer classes consisting of the polyolefins, polystyrenes and polyesters, to defined recycled mixtures, known as polymer blends, or copolymers, for example ABS, SIS, SEBS, PE/PP, PET/PC, PBT/PC or PP/EPDM, but also to recycled plastic mixtures.

These recycled plastic mixtures comprise predominantly thermoplastics, for example polyolefins, polystyrene, polyvinyl chloride and engineering plastics such as polyamides, polycarbonates and polyesters. The recycled plastic mixtures mainly comprise 25–100% by weight, in particular 35–100% by weight, of polyolefins, 0–25% by weight of polystyrene, 0–25% by weight of polyvinyl chloride and 0–25% by weight of other thermoplastics, it also being possible for mixtures to be present within these groups of thermoplastics. Non-thermoplastics may also be present in the mixture in small amounts, e.g. less than 5% by weight.

In particular, the invention relates to recycled plastic mixtures which comprise 55–100% by weight of polyolefins, 0–25% by weight of polystyrene, 0–15% by weight of polyvinyl chloride and 0–10% by weight of other thermoplastics.

A polyolefin mixture comprises, for example, HDPE, PP and/or LDPE and/or LLDPE.

In the case of single-type recyclates, the invention relates, in particular, to polyolefins, polystyrenes and polyesters. Particular preference is given to single-type polyolefin recyclates, for example polypropylene, HD polyethylene, LD polyethylene and polypropylene blends and copolymers, for example PP/EPDM and PP/PE.

The invention furthermore relates to stabilized polyolefin mixtures comprising virtually exclusively polyolefins having different structures.

In plastic mixtures, the dominant polyolefins are usually polyethylene (PE) and polypropylene (PP), in particular low-density polyethylene (LDPE), linear low-density polyethylene (LLDPE) and high-density polyethylene (HDPE), furthermore copolymers such as ethylene-propylene (EPM) and ethylene-propylene-diene (EPDM) copolymers and ULDPE and MDPE. Polystyrene (PS and EPS) is also taken to mean copolymers containing styrene (for example ABS, ASA, HIPS, IPS and SIS), and polyvinyl chloride (PVC) is also taken to mean copolymers predominantly comprising vinyl chloride (for example CPE). Of other thermoplastics, valuable material collections principally contain polyethylene terephthalate (PET), and in addition polyamides, polycarbonate, cellulose acetate and polyvinylidene chloride. Secondary amounts, up to about 5%, of non-thermoplastics, for example polyurethanes, formaldehyde resins and phenolic resins, and typical amino resins, and also elastomers, for example vulcanized or unvulcanized rubber, may also be present. In certain plastic wastes, small amounts of foreign substances, for example paper, pigments and adhesives, which are frequently difficult to remove, may also be present. These foreign substances may also originate from contact with diverse substances during use or processing, for example fuel residues, paint components, traces of metal, printing inks, initiator residues or traces of water.

Preferred macrocyclic compounds containing piperidinyl or piperazinyl groups are macrocyclic compounds of the formulae (III) to (VI) below, particular preference being given to those of the formulae (IV) and (V):

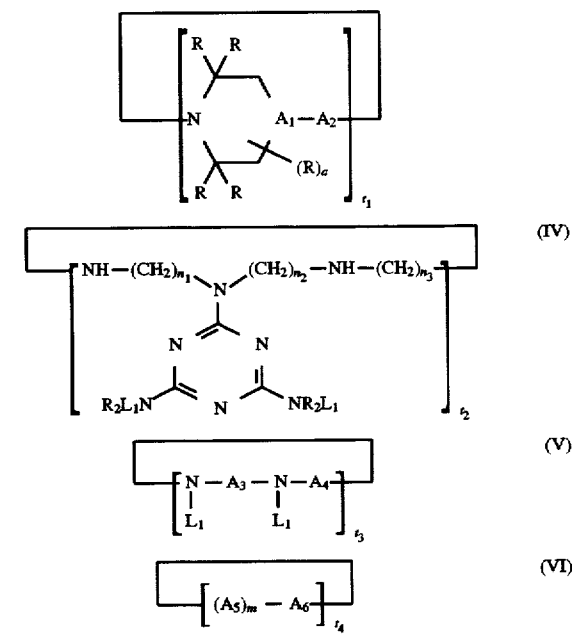

(IV)

(V)

(VI)

where $L_1$ is the radical

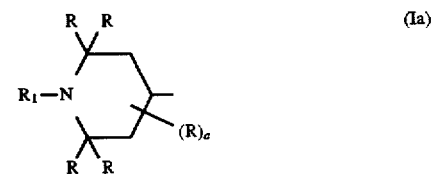

(Ia)

and $A_1$ is >CH— or nitrogen or a substituted carbon atom (*C) of the formula

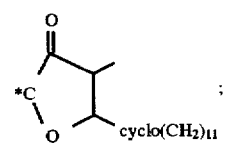

;

$A_2$ is $C_1$–$C_{12}$alkylene, $C_4$–$C_{12}$alkenylene, xylylene, a divalent radical of an aliphatic, cycloaliphatic, araliphatic or aromatic dicarboxylic acid, dicarbamic acid or phosphorus-containing acid or a divalent silyl radical, preferably a radical of an aliphatic dicarboxylic acid having 2 to 36 carbon atoms, of a cycloaliphatic or aromatic dicarboxylic acid having 8 to 14 carbon atoms or of an aliphatic, cycloaliphatic or aromatic dicarbamic acid having 8 to 14 carbon atoms;

$A_3$ and $A_4$, independently of one another, are $C_1$-$C_{12}$alkylene, $C_2$-$C_{12}$alkylene which is interrupted by oxygen, sulfur or $NR_4$, $C_4$-$C_{12}$alkenylene, xylylene or a divalent triazinyl radical of the formula

[structure: triazinyl ring with $A_7$ substituent]

preferably $C_1$-$C_{12}$alkylene, $C_2$-$C_{12}$alkylene which is interrupted by oxygen, sulfur or $NR_4$, or a divalent triazinyl radical of the formula

[structure: triazinyl ring with $A_7$ substituent]

$A_5$ is a radical of the formula

[structure: succinimide-type ring N—NH—C(=O)—C(=O)—NH—$L_1$]

[structure: succinimide-type ring N—$L_1$]

or $L_1$—O—C(=O)—CH$_2$ \\ C(=O)—O—$L_1$ / —O—C(=O)—CH$_2$  CH$_2$—C(=O)—O—

$A_6$ is a radical of the formula

[structure: succinimide ring N—$R_5$]

[structure: —CH$_2$— with CH$_3$ substituent on phenyl]

or

—CH$_2$—(CH$_3$)$_2$C—[spiro bis-dioxane structure]—C(CH$_3$)$_2$—CH$_2$—;

$A_7$ is —O$R_6$, —S$R_6$ or —N$R_4R_6$;

R, independently of one another, are methyl, ethyl or propyl, or two radicals R on the same carbon atom can together be a pentamethylene radical, preferably methyl;

$R_1$ is hydrogen, oxygen, hydroxyl, $C_1$-$C_{12}$alkyl, $C_3$-$C_8$alkenyl, $C_3$-$C_8$alkynyl, phenyl-$C_1$-$C_6$alkyl, $C_1$-$C_{18}$alkoxy, $C_5$-$C_8$cycloalkoxy, $C_7$-$C_9$phenylalkoxy, $C_1$-$C_8$alkanoyl, $C_3$-$C_5$akenoyl, $C_1$-$C_{18}$alkanoyloxy, benzoxy, glycidyl or a —CH$_2$CH(OH)—$R_3$ group, preferably hydrogen, $C_1$-$C_4$alkyl, allyl, benzyl, acetyl or acryloyl;

$R_2$, independently of one another, are hydrogen or $C_1$-$C_{12}$alkyl;

$R_3$ is hydrogen, methyl or phenyl;

$R_4$ is hydrogen, $C_1$-$C_{12}$alkyl or, together with $R_6$, is —(CH$_2$)$_2$—O—(CH$_2$)$_2$—;

$R_5$ is $C_1$-$C_{18}$alkyl;

$R_6$ is hydrogen, $C_1$-$C_{18}$alkyl, ω-hydroxy-$C_1$-$C_{18}$alkyl, ω-$C_1$-$C_{18}$alkoxy-$C_1$-$C_{18}$allyl, $C_3$-$C_{18}$alkenyl, $C_5$-$C_{18}$cycloalkyl, substituted or unsubstituted phenyl, substituted or unsubstituted phenyl-$C_1$-$C_6$alkyl, —CH$_2$—C(=O)—O—$R_5$ or, together with $R_4$, —(CH$_2$)$_2$—O—(CH$_2$)$_2$—, preferably $C_1$-$C_{12}$alkyl, $C_3$-$C_{12}$alkenyl, $C_5$-$C_{12}$cycloalkyl, phenyl, phenyl-$C_1$-$C_4$alkyl, —CH$_2$—C(=O)—O—$R_5$ or, together with $R_4$, —(CH$_2$)$_2$—O—(CH$_2$)$_2$—;

a is the number 0, 1 or 2, preferably 0;

m is the number 1, 2 or 3, preferably 1;

$n_1$, $n_2$ and $n_3$, independently of one another, are a number from 1 to 12, preferably 2, 3, 4 or 6; and $t_1$, $t_2$, $t_3$ and $t_4$, independently of one another, are a number from 1 to 12, preferably a number from 1 to 6.

Suitable alkyl substituents with up to 18 carbon atoms in the above formulae are radicals such as methyl, ethyl, propyl, butyl, pentyl, hexyl, heptyl, octyl, nonyl, decyl, undecyl, dodecyl, tetradecyl, hexadecyl and octadecyl, and the corresponding branched isomers.

Suitable cycloalkyl substituents with up to 18 carbon atoms in the above formulae are radicals such as cyclohexyl, cyclooctyl, cycloundecyl and cyclododecyl.

Suitable ω-hydroxy-alkyl substituents with up to 18 carbon atoms in the above formulae are radicals such as 2-hydroxyethyl, 3-hydroxypropyl, 4-hydroxybutyl and radicals analogous to the above alkyl radicals.

Suitable ω-alkoxyalkyl substituents with up to 36 carbon atoms in the above formulae are radicals such as 2-ethoxyethyl, 3-ethoxypropyl, 4-ethoxybutyl and radicals analogous to the above alkyl radicals.

Suitable alkylene substituents with up to 12 carbon atoms in the above formulae are radicals such as ethylene, 1,2- and 1,3-propylene, tetramethylene, pentamethylene, hexamethylene and radicals analogous to the above alkyl radicals.

Suitable allylene substituents with up to 12 carbon atoms in the above formulae which are interrupted by oxygen, sulfur or $NR_4$ are radicals such as —(CH$_2$)$_2$—O—(CH$_2$)$_2$—, —(CH$_2$)$_3$—O—(CH$_2$)$_3$—, —[(CH$_2$)$_2$—O—(CH$_2$)$_2$]$_{2-3}$—, —(CH$_2$)$_2$—S—(CH$_2$)$_2$—, —(CH$_2$)$_3$—S—(CH$_2$)$_3$—, —[(CH$_2$)$_2$—S—(CH$_2$)$_2$]$_{2-3}$—, —(CH$_2$)$_2$—NH—(CH$_2$)$_2$—, —(CH$_2$)$_3$—NH—(CH$_2$)$_3$—, —[(CH$_2$)$_2$—NH—(CH$_2$)$_2$]$_{2-3}$—, —(CH$_2$)$_2$—N(CH$_2$CH$_3$)—(CH$_2$)$_2$—, —(CH$_2$)$_3$—N(CH$_2$CH$_3$)—(CH$_2$)$_3$— and radicals analogous to the above alkylene radicals.

Suitable alkoxy substituents with up to 18 carbon atoms in the above formulae are radicals such as methoxy and ethoxy, and radicals analogous to the above alkyl radicals.

Suitable alkanoyl substituents with up to 8 carbon atoms in the above formulae are radicals such as formyl, acetyl, propionyl, butyryl and octanoyl.

Suitable alkanoyloxy substituents with up to 18 carbon atoms in the above formulae are radicals such as acetoxy, propionyloxy, butyryloxy and octanoyloxy.

Suitable cycloalkoxy substituents with up to 8 carbon atoms in the above formulae are radicals such as cyclohexyloxy and cyclooctyloxy.

Suitable phenylalkoxy substituents with up to 12 carbon atoms in the above formulae are radicals such as

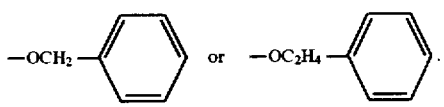

Suitable alkenyl substituents with up to 18 carbon atoms in the above formulae are radicals such as vinyl, prop-1-enyl (—CH=CH—CH$_3$) or prop-2-enyl (—CH$_2$—CH=CH$_2$), and radicals analogous to the above alkyl radicals.

Suitable alkenylene substituents with up to 12 carbon atoms in the above formulae are radicals such as 1,2- and 1,3-prop-1-enylene, 1,4but-1-enylene, 1,4-but-2-enylene, 1,2-but-3-enylene and radicals analogous to the above alkylene radicals.

Suitable alkenoyl substituents with up to 8 carbon atoms in the above formulae are radicals such as acryloyl.

Suitable alkynyl substituents with up to 8 carbon atoms in the above formulae are radicals such as prop-1-ynyl, prop-2-ynyl, but-1-ynyl, but-2-ynyl and radicals analogous to the above alkenyl radicals.

Suitable phenyl—C$_1$-C$_6$alkyl substituents in the above formulae are radicals such as

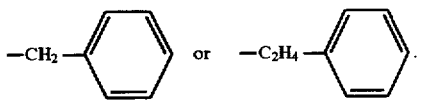

Suitable dicarboxylic acid substituents in the above formulae are radicals such as those of malonic acid, succinic acid, glutaric acid, adipic acid, suberic acid, sebacic acid, maleic acid, itaconic acid, phthalic acid, dibutylmalonic acid, dibenzylmalonic acid, butyl(3,5-di-tert-butyl-4-hydroxybenzyl)malonic acid, bicycloheptenedicarboxylic acid, hexamethylenedicarbamic acid and 2,4-tolylenedicarbamic acid.

Substituents on phenyl radicals are taken to mean one to five, preferably one or two, substituents such as C$_1$-C$_8$alkyl, C$_1$-C$_8$alkoxy or —OH.

A particularly preferred macrocyclic compound containing piperidinyl or piperazinyl groups is a macrocyclic compound of the formula

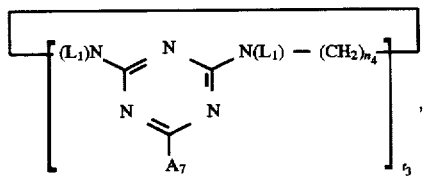
(VII)

where L$_1$ is the radical

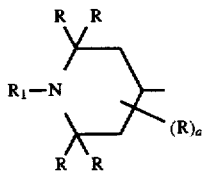
(Ia)

and
A$_7$ is —NR$_4$R$_6$;
R is methyl;
R$_1$ is hydrogen, oxygen, hydroxyl, C$_1$-C$_{12}$alkyl, C$_3$-C$_8$alkenyl, phenyl-C$_1$-C$_6$alkyl, C$_1$-C$_{18}$alkoxy, C$_3$-C$_5$alkenoyl or C$_1$-C$_{18}$alkanoyloxy, preferably hydrogen, C$_1$-C$_4$alkyl, allyl, benzyl, acetyl or acryloyl;
R$_4$ is hydrogen, C$_1$-C$_{12}$alkyl or, together with R$_6$, —(CH$_2$)$_2$—O—(CH$_2$)$_2$—;

R$_5$ is C$_1$-C$_{18}$allyl;
R$_6$ is C$_1$-C$_{18}$alkyl, C$_3$-C$_{18}$alkenyl, C$_5$-C$_{18}$cycloalkyl, substituted or unsubstituted phenyl, substituted or unsubstituted phenyl-C$_1$-C$_6$alkyl, —CH$_2$—C(=O)—O—R$_5$ or, together with R$_4$, —(CH$_2$)$_2$—O—(CH$_2$)$_2$—, preferably C$_1$-C$_{12}$alkyl, C$_3$-C$_{12}$alkenyl, C$_5$-C$_{12}$cycloalkyl, phenyl, phenyl-C$_1$-C$_4$alkyl, —CH$_2$—C(=O)—O—R$_5$ or, together with R$_4$, —(CH$_2$)$_2$—O—(CH$_2$)$_2$—;
a is the number 0, 1 or 2, preferably 0;
n$_4$ is a number from 1 to 12, preferably 2, 3, 4 or 6; and
t$_3$ is a number from 1 to 4, preferably 1 or 2.

The macrocyclic compound containing piperidinyl or piperazinyl groups is very particularly preferably a macrocyclic compound of the formula (VII), as described above, where R$_4$ is hydrogen or, together with R$_6$, —(CH$_2$)$_2$—O—(CH$_2$)$_2$—, R$_6$ is —C(CH$_3$)$_2$—CH$_2$—C(CH$_3$)$_3$, cyclohexyl, phenyl, —CH$_2$—C(=O)—O—R$_5$ or, together with R$_4$, —(CH$_2$)$_2$—O—(CH$_2$)$_2$—.

The compounds of the formula VII can, if desired, be in the form of a mixture of the monomeric compounds (t$_3$=1), dimeric compounds (t$_3$=2), trimeric compounds (t$_3$=3) and/or tetrameric compounds (t$_3$=4).

A compound of the formula VII in which t$_3$ is 2 can, for example, be in the form of a mixture with a compound of the formula VII in which t$_3$ is 1 in a ratio of from 10:1 to 1:10.

A preferred embodiment of the invention is a stabilized recycled plastic comprising from 0.01 to 5% by weight, based on the plastic, of a mixture of the compounds VII-A and VII-B

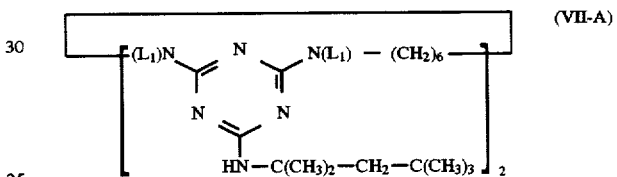
(VII-A)

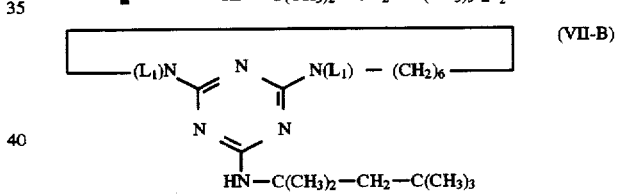
(VII-B)

where L$_1$ is

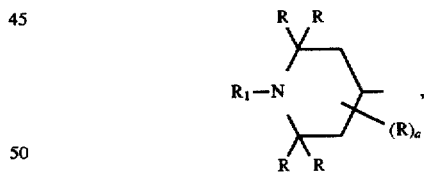

R is —CH$_3$, R$_1$ is H and a is 0,
in a ratio (parts by weight) of from 10:1 to 1:10, preferably from 10:1 to 1:1 or from 5:1 to 1:1. A particularly preferred ratio between the compounds (VII-A) and (VII-B) is 7:3.

The above-described macrocyclic compounds are disclosed, for example, in U.S. Pat. No. 4,442,250, U.S. Pat. No. 5,004,759 and EP-A-0 446 171 or can be obtained by the methods outlined therein.

In accordance with the invention, from 0.01 to 2% by weight of at least one sterically hindered phenol and/or from 0.01 to 2% by weight of at least one organic phosphite or phosphonite can additionally be added to the recycled plastic.

The phenol:ester weight ratio is preferably from 20:1 to 1:20, particularly preferably from 10:1 to 1:10, very particularly preferably 4:1 to 1:4.

The sterically hindered phenols are known stabilizers against thermooxidative ageing of plastics, in particular polyolefins. These compounds preferably contain at least one group of the formula (X)

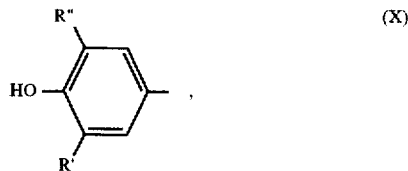

in which R' is hydrogen, methyl or tert-butyl, and R" is substituted or unsubstituted alkyl or substituted alkylthioalkyl.

Examples of sterically hindered phenols of this type are: 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-i-butylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol, 2,6-di-tert-butyl-4-methoxyphenol, 2,5-di-tert-butylhydroquinone, 2,5-di-tert-amylhydroquinone, 2,6-diphenyl-4octadecyloxyphenol, 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl) dicyclopentadiene, bis[2-(3'-tert-butyl-2'-hydroxy-5'-methylbenzyl)-6-tert-butyl-4-methylphenyl]terephthalate, 1,3,5-tris(3,5-di-tert-butyl-4-hydroxybenzyl)-2,4,6-trimethylbenzene, bis(3,5-di-tert-butyl-4-hydroxybenzyl) sulfide, isooctyl 3,5-di-tert-butyl-4-hydroxybenzylmercaptoacetate, bis(4-tert-butyl-3-hydroxy-2,6-dimethylbenzyl) dithioterephthalate, 1,3,5-tris(3,5-di-tert-butyl-4-hydroxybenzyl) isocyanurate, 1,3,5-tris(4-tert-butyl-3-hydroxy-2,6-dimethylbenzyl)isocyanurate, dioctadecyl 3,5-di-tert-butyl-4-hydroxybenzylphosphonate and the calcium salt of monoethyl 3,5-di-tert-butyl-4-hydroxybenzylphosphonate.

Particular preference is given to compounds containing at least one group of the formula

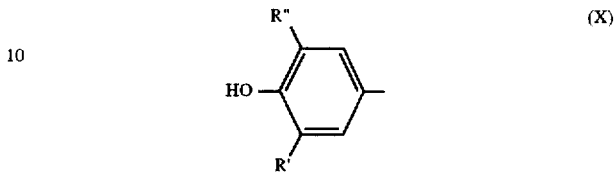

in which R' is methyl or tert-butyl, and R" is substituted or unsubstituted alkyl or substituted alkylthioalkyl.

Examples of such hindered phenols are the esters of β-(3,5-di-tert-butyl-4-hydroxyphenyl)propionic acid and of β-(5-tert-butyl-4-hydroxy-3-methylphenyl)propionic acid with monohydric or polyhydric alcohols, for example with methanol, octanol, octadecanol, 1,6-hexanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, and the amides of these acids, for example N,N'-bis(3,5-di-tert-butyl-4-hydroxyphenylpropionyl)hexamethylenediamine, N,N'-bis(3,5-di-tert-butyl-4-hydroxyphenylpropionyl) trimethylenediamine and N,N'-bis(3,5-di-tert-butyl4-hydroxyphenylpropionyl)hydrazine, and bis(3-tert-butyl-4-hydroxy-5-methylphenyl)dicyclopentadiene and corresponding oligomers.

Other particularly preferred compounds are:

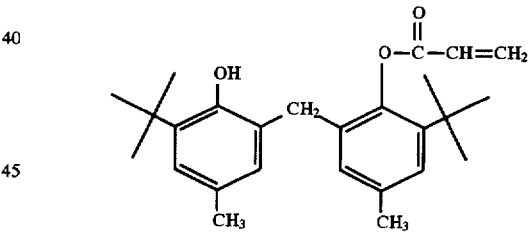

(2-(1,1-dimethylethyl)-6-[[3-(1,1-dimethylethyl)-2-hydroxy-5-methylphenyl]methyl]-4-methylphenyl 2-propenoate),

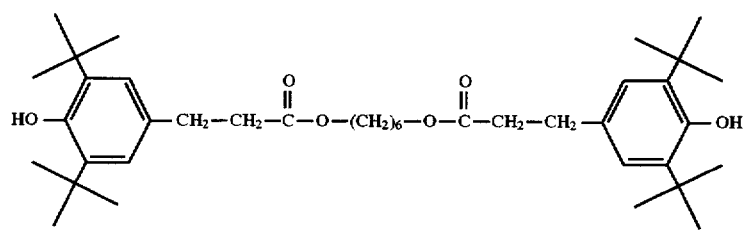

(1,6-hexylene 3,5-bis(1,1-dimethylethyl)-4-hydroxybenzenepropionate).

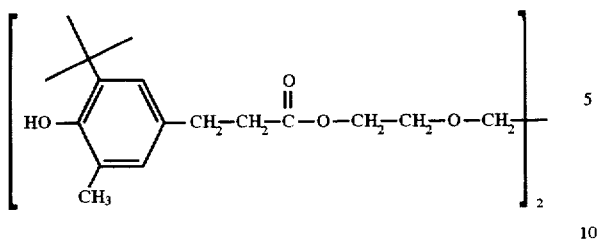

(triethylene glycol bis|3-(1,1-dimethylethyl)-4-hydroxy-5-methylphenylpropionate|).

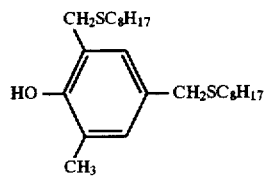

(2-methyl-4,6-bis|(octylthio)methyl|phenol).

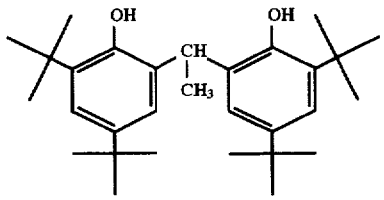

(2.2'-ethylidenebis(4,6-di-tert-butylphenol);

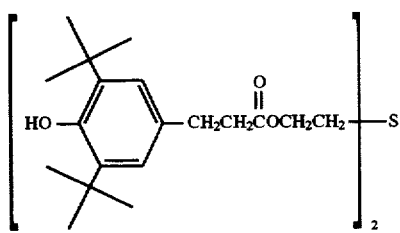

(thiodiglycol bis[3,5-bis(1,1-dimethylethyl)-4-hydroxybenzenepropionate]).

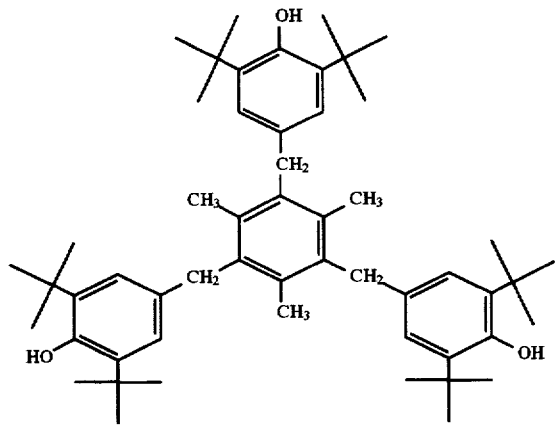

(1,3,5-tris|2,6-bis(1,1-dimethylethyl)-4-hydroxybenzyl|-2,4,6-trimethylbenzene).

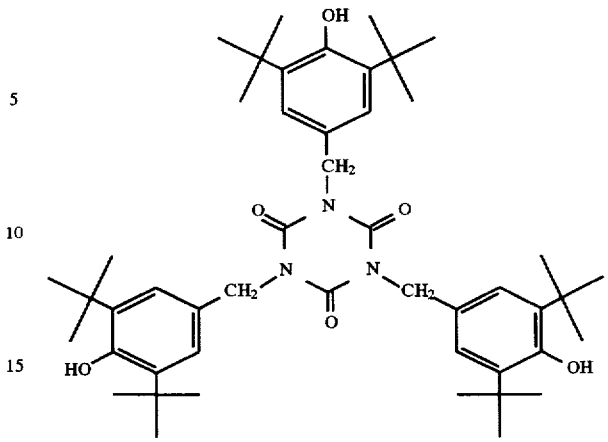

(1,3,5-tris[[3,5-bis(1,1-dimethylethyl)-4-hydroxyphenyl] methyl]-1,3,5-triazine-2,4,6(1H,3H,5H)trione).

Very particular preference is given to the pentaerythrityl ester, the octyl ester and the octadecyl ester of β-(3,5-di-tert-butyl-4-hydroxyphenyl)propionic acid, 2,2'-ethylidenebis(4,6-di-tert-butylphenol) and bis(3-tert-butyl-4-hydroxy-5-methylphenyl)dicyclopentadiene and the corresponding oligomers.

The organic phosphites and phosphonites are likewise known as stabilizers for plastics. They are used, in particular, as processing stabilizers for polyolefins.

They are predominantly aromatic phosphites and phosphonites, for example triphenyl phosphite, diphenyl alkyl phosphites, phenyl dialkyl phosphites, tris(diphenyl alkyl phosphite)amines, tris(nonylphenyl) phosphite, trilauryl phosphite, trioctadecyl phosphite, distearyl pentaerythrityl diphosphite, tris(2,4-di-tert-butylphenyl) phosphite, distearyl pentaerythrityl diphosphite, bis(2,4-di-tert-butylphenyl) pentaerythrityl diphosphite, tristearyl sorbityl triphosphite, tetrakis(2,4di-tert-butylphenyl)-4,4'-biphenylene diphosphonite, 3,9-bis(2,4-di-tert-butyl-4-methylphenoxy)-2,4,8,10-tetraoxa-3,9-diphosphaspiro[5.5] undecane, 3,9-tris(2,4,6-tris-tert-butylphenoxy)-2,4,8,10-tetraoxa-3,9-diphosphaspiro[5,5]undecane and 2,2'-ethylidenebis(4,6-di-tert-butylphenyl) fluorophosphite. Particular preference is given to the following phosphites: tris(2,4-di-tert-butylphenyl)phosphite;

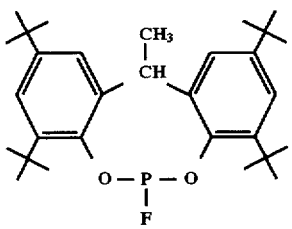

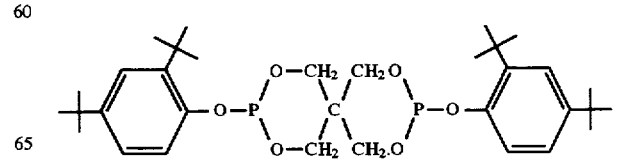

-continued

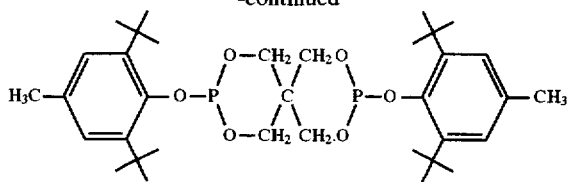

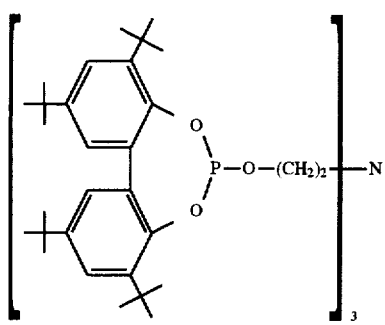

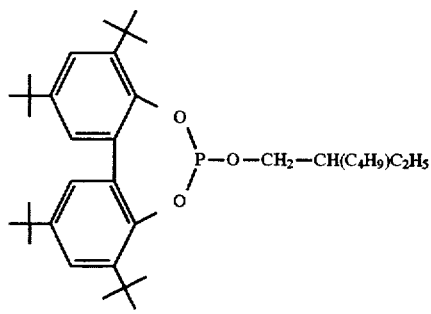

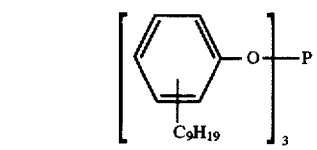

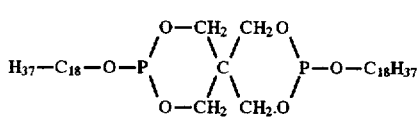

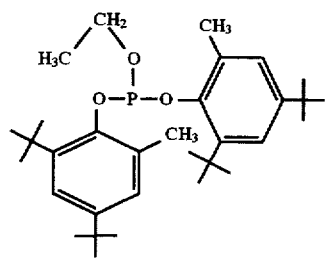

Very particular preference is given to tris(2,4-di-tert-butylphenyl) phosphite.

Also expedient are plastic compositions as described above which additionally comprise a metal soap, for example an organozinc, organomagnesium or organocalcium compound from the series consisting of aliphatic saturated $C_1$–$C_{22}$carboxylates, aliphatic olefinic $C_2$–$C_{22}$carboxylates, aliphatic $C_2$–$C_{22}$carboxylates which are substituted by at least one OH group, cyclic and bicyclic carboxylates having 5–22 carbon atoms, aromatic $C_6$–$C_{22}$carboxylates, aromatic $C_6$–$C_{22}$carboxylates which are substituted by at least one OH group, $C_1$–$C_{16}$alkyl-substituted phenylcarboxylates, phenyl— $C_1$–$C_{16}$alkylcarboxylates, $C_6$–$C_{18}$phenoxides, $C_5$–$C_{26}$chelates of 1,3-diketones or β-ketocarboxylates, dehydraacetic acid and derivatives thereof, mercaptides based on mercaptocarboxylates, and glycinates.

Also expedient are plastic compositions as described above which additionally comprise an inorganic compound from the series consisting of metal oxides, metal hydroxides and metal carbonates.

These are, in particular, metal oxides, metal hydroxides and metal carbonates of elements from main group I or sub-group II, IV or VII. Preference is furthermore given to calcium, magnesium, zinc, titanium and manganese as metals, the oxides being particularly preferred, such as CaO, MgO, ZnO, $TiO_2$, $MnO_2$ and very particularly calcium oxide, magnesium oxide and zinc oxide. Calcium oxide is especially preferred.

It may also be possible, where appropriate, to use a mixture of various inorganic compounds, for example a mixture of calcium oxide and calcium carbonate.

An example which may be given of a metal hydroxide is magnesium hydroxide, and an example which may be given of a metal carbonate is calcium carbonate. It is also possible to use salts with various anions, for example magnesium aluminium hydroxycarbonates, known as hydrotalcites.

In addition to the macrocyclic compound, the hindered phenol, the phosphite or phosphonite, the metal soap and the metal oxide, metal hydroxide or metal carbonate, further stabilizers can be added to the recycled plastic. These further stabilizers are known in general terms to the person skilled in the art and are selected depending on the specific requirements of the end product. In particular, light stabilizers or antioxidants or further antioxidants can be added ("Plastics Additives Handbook", Ed R. Gächter and H. Müller, Hanser Verlag, 3rd Edn. 1990). It is also possible to add further additives, for example lubricants, mould-release agents, fillers or reinforcing substances, for example glass fibres, flameproofing agents or antistatics.

The following may be mentioned as being particularly suitable:

1. Antioxidants 1.1. Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol, 2,4dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.

1.3. Hydroquinones and alkylated hydroquinones, for example 2,6-di-tert-butyl-4-methoxyphenol, 2,5-di-tert-butyl-hydroquinone, 2,5-di-tert-amyl-hydroquinone, 2,6-diphenyl-4-octadecyloxyphenol, 2,6-di-tert-butyl-hydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Chroman derivatives of the formula

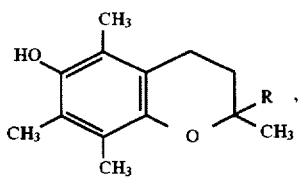

where R is —(CH$_2$)$_3$—CH(CH$_3$)—(CH$_2$)$_3$—CH(CH$_3$)—(CH$_2$)$_3$—CH—(CH$_3$)$_2$ or —CH$_2$—CH$_2$—O—C(O)—Z, and Z is C$_1$-C$_{18}$alkyl, —CH$_2$—CH$_2$—S—C$_1$-C$_{18}$alkyl or

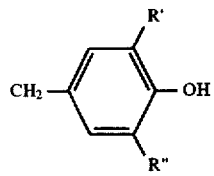

and R' and R" are hydrogen, methyl or tert-butyl, for example α-tocopherol, β-tocopherol, γ-tocopherol, δ-tocopherol and mixtures thereof (vitamin E).

1.5. Hydroxylated diphenyl thioethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

1.6. Alkylidenebisphenols, for example 2,2'-methylene-bis(6-tert-butyl-4-methylphenol), 2,2'-methylene-bis(6-tert-butyl-4-ethylphenol), 2,2'-methylene-bis[4-methyl-6-(α-methylcyclohexyl)phenol], 2,2'-methylene-bis(4-methyl-6-cyclohexylphenol), 2,2'-methylene-bis(6-nonyl-4-methylphenol), 2,2'-methylene-bis(4,6-di-tert-butylphenol), 2,2'-ethylidene-bis(4,6di-tert-butylphenol), 2,2'-ethylidene-bis(6-tert-butyl-4-isobutylphenol), 2,2'-methylene-bis[6(α-methylbenzyl)-4-nonylphenol], 2,2'-methylene-bis[6-(α,α-dimethylbenzyl)-4-nonylphenol], 4,4'-methylene-bis(2,6-di-tert-butylphenol), 4,4'-methylene-bis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl) dicyclopentadiene, bis[2-(3'-tert-butyl-2'-hydroxy-5'-methylbenzyl)-6-tert-butyl-4-methyl-phenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane.

1.7. O-, N- and S-benzyl compounds, for example 3,5,3', 5'-tetra-tert-butyl-4,4'-dihydroxydibenzyl ether, octadecyl 4-hydroxy-3,5-dimethylbenzylmercaptoacetate, tris(3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl) sulfide, isooctyl 3,5-di-tert-butyl-4-hydroxybenzylmercaptoacetate.

1.8. Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl) malonate, didodecylmercaptoethyl 2,2-bis(3,5-di-tert-butyl-4-hydroxybenzyl)malonate, di[4-(1,1,3,3-tetramethylbutyl)phenyl]2,2-bis(3,5-di-tert-butyl-4-hydroxybenzyl)malonate.

1.9. Hydroxybenzyl aromatic compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bisoctylmercapto-6-(3,5-di-tert-butyl-4-hydroxyanilino)-1, 3,5-triazine, 2-octylmercapto-4,6-bis(3,5-di-tert-butyl-4-hydroxyanilino)-1,3,5-triazine, 2-octylmercapto-4,6-bis(3, 5-di-tert-butyl-4-hydroxyphenoxy)-1,3,5-triazine, 2,4,6-tris (3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate.

1.11. Benzylphosphonates, for example dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzylphosphonate, the calcium salt of monoethyl 3,5-di-tert-butyl-4-hydroxybenzyl phosphonate.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

1.14. Esters of β-(5-tert-butyl-4-hydroxy-3-methylphenyl)propionic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxalamide, 3-thiaundecanol, 3-thiapentadecanol, trimethylhexanediol, trimethylopropane, 4-hydroxymethyl-1-phospha-2,6,7-trioxabicyclo-[2.2.2]-octane .

1.15. Esters of β-(3,5-dicyclohexyl-4-hydroxyphenyl) propionic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

1.16. Esters of 3,5-di-tert-butyl-4-hydroxyphenylacetic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

1.17. Amides of β-(3,5-di-tert-butyl-4-hydroxyphenyl) proionic acid, for example N,N'-bis(3,5-di-tert-butyl-4- hydroxyphenylpropionyl)hexamethylenediamine, N,N'-bis (3,5-di-tert-butyl-4-hydroxyphenylpropionyl) trimethylenediamine, N,N'-bis(3,5-di-tert-butyl-4-hydroxyphenylpropionyl)hydrazine.

Furthermore, one or more additional light stabilizers or UV absorbers can be added, in accordance with the invention, to the plastic. Particularly suitable light stabilizers and UV absorbers for this purpose are those from the series consisting of the benzophenones, benzotriazoles, oxanilides and linear, sterically hindered amines. Examples of such compounds are:

1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octoxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chlorobenzotriazole, 2-(3'-tert-butyl-5'-|2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl) phenylbenzotriazole, 2,2'-methylenebis[4-(1,1,3,3-tetramethylbutyl)-6-benzotriazol-2-yl phenol]; transesterification product of 2-[3'-tert-butyl-5'-(2-methoxycarbonylethyl)-2'-hydroxyphenyl|benzotriazole with polyethylene glycol 300; [R—CH$_2$CH$_2$—COO(CH$_2$)$_3$-]$_2$ where R=3'-tert-butyl-4'-hydroxy-5'-2H-benzotriazol-2-ylphenyl.

2. 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivatives.

3. Esters of unsubstituted or substituted benzoic acids, for example 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

4. Acrylates, for example ethyl and isooctyl α-cyano-β, β-diphenylacrylate, methyl α-carbomethoxycinnamate, methyl and butyl α-cyano-β-methyl-p-methoxycinnamate, methyl α-carbomethoxy-p-methoxycinnamate and N-(β-carbomethoxy-β-cyanovinyl)-2-methylindoline.

5. Nickel compounds, for example nickel complexes of 2,2'-thiobis[4-(1,1,3,3-tetramethylbutyl)phenol], such as the 1:1 and 1:2 complexes, if desired with additional ligands, such as n-butylamine, triethanolamine or N-cyclohexyldiethanolamine, nickel dibutyldithiocarbamate, nickel salts of monoalkyl esters, such as the methyl or ethyl esters, of 4-hydroxy-3,5-di-tert-butylbenzylphosphonic acid, nickel complexes of ketoximes, such as of 2-hydroxy-4-methylphenyl undecyl ketoxime, and nickel complexes of 1-phenyl-4-lauroyl-5-hydroxypyrazole, if desired with additional ligands.

6. Linear sterically hindered amines, for example bis(2, 2,6,6-tetramethylpiperidyl) sebacate, bis(2,2,6,6-tetramethylpiperidyl) succinate, bis(1,2,2,6,6-pentamethylpiperidyl) sebacate, bis(1,2,2,6,6-pentamethylpiperidyl) n-butyl-3,5-di-tert-butyl-4-hydroxybenzylmalonate, the product of the condensation of 1-hydroxyethyl-2,2,6,6-tetramethyl-4-hydroxypiperidine and succinic acid, the product of the condensation of N,N'-bis(2,2,6,6-tetramethyl-4-piperidyl)hexamethylenediamine and 4-tert-octylamino-2,6-dichloro-1,3,5-s-triazine, tris(2,2, 6,6-tetramethyl-4-piperidyl) nitrilotriacetate, tetrakis(2,2,6, 6-tetramethyl-4-piperidyl) 1,2,3,4-butanetetraoate, 1,1'-(1, 2-ethanediyl)bis-(3,3,5,5-tetramethylpiperazinone), 4-benzoyl-2,2,6,6-tetramethylpiperidine, 4-stearyloxy-2,2, 6,6-tetramethylpiperidine, bis(1,2,2,6,6-pentamethylpiperidyl) 2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl) succinate, the product of the condensation of N,N'-bis(2,2,6,6-tetramethyl-4-piperidyl) hexamethylenediamine and 4morpholino-2,6-dichloro-1,3, 5-triazine, the product of the condensation of 2-chloro-4,6-di(4-n-butylamino-2,2,6,6-tetramethylpiperidyl)1,3,5-triazine and 1,2-bis(3-aminopropylamino)ethane, the product of the condensation of 2-chloro-4,6-di(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2, 4-dione, 3-dodecyl-1-(2,2,6,6-tetramethyl-4-piperidyl) pyrrolidine-2,5-dione, 3-dodecyl-1-(1,2,2,6,6-pentamethyl-4-piperidyl)pyrrolidine-2,5-dione, bis(1-octyloxy-2,2,6,6-tetramethyl-4-piperidyl) sebacate.

7. Oxalamides, for example 4,4'-dioctyloxyoxanilide, 2,2'-diethoxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and mixtures thereof with 2-ethoxy-2'-ethyl-5,4'-di-tert-butyloxanilide, and mixtures of o- and p-methoxy- and of o- and p-ethoxy-disubstituted oxanilides.

8. 2-(2-Hydroxyphenyl)-1,3,5-triazines, for example 2,4, 6-tris(2-hydroxy-4-octyloxyphenyl)-1,3,5-triazine, 2-(2-hydroxy-4-octyloxyphenyl)-4,6-bis(2,4-dimethylphenyl)-1, 3,5-triazine, 2-(2,4-dihydroxyphenyl)-4,6-bis(2,4-dimethylphenyl)-1,3,5-triazine, 2,4-bis(2-hydroxy-4-propoxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis (2,4-dimethylphenyl)-1,3,5-triazine, 2-|2-hydroxy-4-(2-hydroxy-3-butoxypropoxy)phenyl|-4,6-bis(2,4-dimethylphenyl)-1,3,5-triazine, 2-|2-hydroxy-4-(2-hydroxy-3-octyloxypropoxy)phenyl|-4,6-bis(2,4-dimethylphenyl)-1,3,5-triazine.

The light stabilizers or UV absorbers are preferably added in an amount of from 0.01 to 2% by weight, in particular from 0.05 to 0.5% by weight, based on the plastic. The additional light stabilizer or UV absorber is preferably a linear sterically hindered amine, a compound of the benzotriazole type or a benzophenone.

The linear sterically hindered amine can be either a low-molecular-weight compound or an oligomeric or polymeric compound. An example of a preferred low-molecular-weight compound is bis(2,2,6,6-tetramethyl-4-piperidyl)

sebacate. Examples which may be mentioned of preferred oligomeric or polymeric compounds are poly{[6-(1,1,3,3-tetramethylbutyl)amino]1,3,5-triazine-2,4-diyl][2-(2,2,6,6-tetramethyl-4-piperidyl)imino]hexamethylene[4-(2,2,6,6-tetramethyl-4-piperidyl)imino]} (®Chimassorb 994), poly-(N-β-hydroxyethyl-2,2,6,6-tetramethyl-4-hydroxypiperidinylsuccinic acid ester (®Tinuvin 622) and 1,5,8,12-tetrakis[2,4-bis[N-(1,2,2,6,6-pentamethyl-4-piperidyl)butylamino]-1,3,5-triazin-6-yl]-1,5,8,12-tetraazadodecane (®Chimassorb 119).

Particularly preferred compounds of the benzotriazole type are 2-(3'-tert-butyl-2'-hydroxy-5'-methylphenyl)-5-chlorobenzotriazole, 2-(3',5'-di-tert-butyl-2'-hydroxyphenyl)-5-chlorobenzotriazole and 2-(3',5'-di-tert-butyl-2'-hydroxyphenyl)benzotriazole.

An example of a particularly preferred benzophenone is 2-hydroxy-4-octoxybenzophenone.

If necessary, further conventional plastics additives can be added to the recycled plastic, for example fillers, such as sawdust or mica, reinforcing materials, such as glass fibres, glass beads or mineral fibres, pigments, plasticizers, lubricants, flameproofing agents, antistatics or blowing agents. Such additives depend on the intended use of the recyclate.

The recycled plastic stabilized in accordance with the invention preferably additionally comprises a filler.

For the purposes of this invention, the term fillers is taken to mean, in particular, mineral fillers. Examples of mineral fillers are carbonates (preferably calcium carbonates, such as chalk), silicates (preferably talc, kaolin, mica, wollastonite and silica), aluminium trihydrate, carbon black and titanium dioxide. Of the preferred fillers chalk, talc, kaolin, mica, wollastonite and silica, talc is very particularly preferred. It is possible to use either an individual filler or a mixture of two or more fillers. Examples of such a mixture of fillers are talc and carbon black or talc and titanium dioxide.

The filler can be present in an amount of 0.01–75% by weight, for example 5–75% by weight or 10–40% by weight, based on the recycled plastic.

A preferred filler is carbon black, which is present in the recycled plastic in, in particular, an amount of 0.01–5% by weight.

In the case of plastic mixtures, it may also be advantageous to add compatibilizers. The compatibilizers can be, for example, copolymers, in particular block copolymers, of styrene and butadiene and, if desired, acrylonitrile. They can be copolymers of ethylene and propylene and may also contain a third monomer component, for example butadiene.

Chlorinated polyethylene or ethylene-vinyl acetate copolymers are also suitable as compatibilizers, naturally depending on the particular composition of the recyclate.

Further suitable compatibilizers contain, in particular, polar groups, for example maleic anhydride-styrene copolymers or graft polymers containing acrylic acid groups, maleic anhydride groups or glycidyl groups.

These polymeric compatibilizers are generally used in amounts of 2–20% by weight, based on the plastic mixture.

Further preferred embodiments of the invention are:

A) A stabilized recycled plastic comprising from 0.01 to 5% by weight, based on the plastic, of a mixture of compounds VII-A and VII-B, from 0.01 to 2% by weight of at least one sterically hindered phenol, from 0.01 to 2% by weight of at least one organic phosphite or phosphonite and from 0.01 to 2% by weight of at least one metal soap.

B) A stabilized recycled plastic comprising from 0.01 to 5% by weight, based on the plastic, of a mixture of compounds VII-A and VII-B, from 0.01 to 2% by weight of at least one sterically hindered phenol, from 0.01 to 2% by weight of at least one organic phosphite or phosphonite and from 0.01 to 2% by weight of at least one metal oxide and, if desired, from 0.01 to 2% by weight of at least one metal soap.

C) A stabilized recycled plastic comprising from 0.01 to 5% by weight, based on the plastic, of a mixture of compounds VII-A and VII-B, from 0.01 to 2% by weight of at least one sterically hindered phenol, from 0.01 to 2% by weight of at least one organic phosphite or phosphonite and from 0.01 to 2% by weight of at least one linear sterically hindered amine.

D) A stabilized recycled plastic comprising from 0.01 to 5% by weight, based on the plastic, of a mixture of compounds VII-A and VII-B, from 0.01 to 2% by weight of at least one sterically hindered phenol, from 0.01 to 2% by weight of at least one organic phosphite or phosphonite and from 0.01 to 2% by weight of at least one benzotriazole.

Further particularly preferred embodiments of the invention are the following:

I) A stabilized recycled plastic comprising from 0.01 to 5% by weight, based on the plastic, of a mixture of compounds VII-A and VII-B and from 0.01 to 2% by weight of poly(N-β-hydroxyethyl-2,2,6,6-tetramethyl-4-hydroxypiperidinylsuccinic acid ester).

II) A stabilized recycled plastic comprising from 0.01 to 5% by weight, based on the plastic, of a mixture of compounds VII-A and VII-B and from 0.01 to 2% by weight of 2-(3'-tert-butyl-2'-hydroxy-5'-methylphenyl)-5-chlorobenzotriazole, 2-(3',5'-di-tert-butyl-2'-hydroxyphenyl)-5-chlorobenzotriazole or 2-(3',5'-di-tert-butyl-2'-hydroxyphenyl)benzotriazole.

III) A stabilized recycled plastic comprising from 0.01 to 5% by weight, based on the plastic, of a mixture of compounds VII-A and VII-B, from 0.01 to 2% by weight of the pentaerythrityl ester of β-(3,5-di-tert-butyl-4-hydroxyphenyl)propionic acid, from 0.01 to 2% by weight of tris(2,4-di-tert-butylphenyl) phosphite and from 0.01 to 2% by weight of calcium stearate.

IV) A stabilized recycled plastic comprising from 0.01 to 5% by weight, based on the plastic, of a mixture of compounds VII-A and VII-B, from 0.01 to 2% by weight of the pentaerythrityl ester of β-(3,5-di-tert-butyl-4-hydroxyphenyl)propionic acid, from 0.01 to 2% by weight of tris(2,4-di-tert-butylphenyl) phosphite and from 0.01 to 2% by weight of calcium oxide.

V) A stabilized recycled plastic comprising from 0.01 to 5% by weight, based on the plastic, of a mixture of compounds VII-A and VII-B, from 0.01 to 2% by weight of the pentaerythrityl ester of β-(3,5-di-tert-butyl-4-hydroxyphenyl)propionic acid, from 0.01 to 2% by weight of tris(2,4-di-tert-butylphenyl) phosphite and from 0.01 to 2% by weight of poly(N-β-hydroxyethyl-2,2,6,6-tetramethyl-4-hydroxypiperidinylsuccinic acid ester).

VI) A stabilized recycled plastic comprising from 0.01 to 5% by weight, based on the plastic, of a mixture of compounds VII-A and VII-B, from 0.01 to 2% by weight of the pentaerythrityl ester of β-(3,5-di-tert-butyl-4-hydroxyphenyl)propionic acid, from 0.01 to 2% by weight of tris(2,4-di-tert-butylphenyl) phosphite and from 0.01 to 2% by weight of poly{[6-[(1,1,3,3-tetramethylbutyl)amino]-1,3,5-triazin-2,4-diyl][2-(2,2,6,6-tetramethyl-4-piperidyl)imino]hexamethylene[4-(2,2,6,6-tetramethyl-4-piperidyl)imino]}.

VII) A stabilized recycled plastic comprising from 0.01 to 5% by weight, based on the plastic, of a mixture of compounds VII-A and VII-B, from 0.01 to 2% by weight of the pentaerythrityl ester of β-(3,5-di-tert-butyl-4-hydroxyphenyl)propionic acid, from 0.01 to 2% by weight of tris(2,4-di-tert-butylphenyl) phosphite and from 0.01 to 2% by weight of 2-(3'-tert-butyl-2'-hydroxy-5'-methylphenyl)-5-chlorobenzotriazole, 2-(3',5'-di-tert-butyl-2'-hydroxyphenyl)-5-chlorobenzotriazole or 2-(3',5'-di-tert-butyl-2'-hydroxyphenyl)benzotriazole.

The invention also relates to a stabilizer mixture comprising from 0.01 to 5 parts of a mixture of compounds VII-A and VII-B in a ratio of from 10:1 to 1:10, from 0.01 to 2 parts of at least one sterically hindered phenol, from 0.01 to 2 parts of at least one organic phosphite or phosphonite and from 0.01 to 2 parts of at least one metal soap, metal oxide, linear sterically hindered amine or benzotriazole.

The invention also relates to a stabilizer mixture comprising from 0.01 to 5 parts of a mixture of compounds VII-A and VII-B in a ratio of from 10:1 to 1:10 and from 0.01 to 2 parts of at least one benzotriazole or benzophenone, and, if desired, from 0.01 to 2 parts of a linear sterically hindered amine.

The invention furthermore relates to a process for the stabilization of recycled plastics, which comprises adding to the plastic or plastic mixture from 0.01 to 5% by weight, based on the plastic, of at least one macrocyclic compound containing a radical of the formula

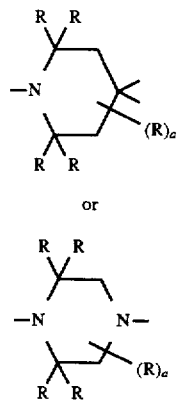

in the macrocycle or in a side group of the macrocycle, where the macrocycle comprises at least 8 atoms and in which the substituents R, independently of one another, are methyl, ethyl or propyl, but preferably methyl, or two radicals R on the same carbon atom together are alternatively a pentamethylene radical, and a is the number 0, 1 or 2, preferably 0.

The invention furthermore relates to the use of at least one macrocyclic compound containing a radical of the formula

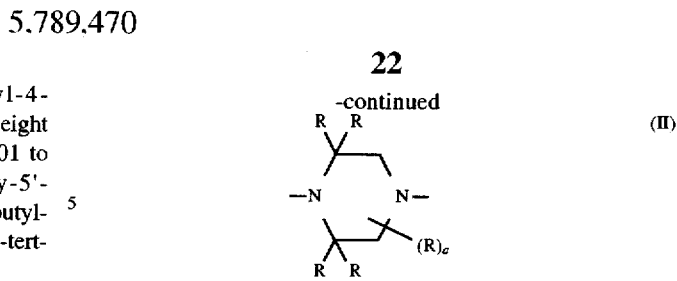

in the macrocycle or in a side group of the macrocycle, where the macrocycle comprises at least 8 atoms and in which the substituents R, independently of one another, are methyl, ethyl or propyl, but preferably methyl, or two radicals R on the same carbon atom together are alternatively a pentamethylene radical, and a is the number 0, 1 or 2, preferably 0, for stabilizing recycled plastics, for example recycled plastics containing carbon black.

The preferences described in greater detail above for the stabilized recycled plastics and plastic mixtures apply analogously to the novel process and use.

The novel stabilizer or mixtures comprising same and, if desired, the additives mentioned can be employed in compact, extruded form or on a support material, or alternatively can be added directly to the recyclate as a mixture or in the form of powders. In this case, the stabilizers can be added individually or as a mixture or alternatively in the form of a masterbatch.

The recyclate stabilized in accordance with the present invention can be converted into the desired shape by known methods. Such methods are, for example, grinding, calendering, extrusion, injection moulding, sintering, spinning and extrusion blow moulding.

The recyclates stabilized in this way can be used for a wide variety of purposes, for example for pipes, profiles, sheets, cable insulation, sports equipment, garden furniture, films, construction parts, automobile and machine parts and receptacles of all types, for example bottles, drums or containers.

The recyclate can also be mixed with fresh plastics or employed together with fresh plastics, for example in a coextrusion process.

The examples below illustrate the invention in greater detail. In these examples, as in the remainder of the description, parts and percentages are by weight, and

denotes tert-butyl, unless specified otherwise.

EXAMPLES 1 AND 2

48.5 g of HIPS/PS recyclate (high impact polystyrene:polystyrene 60:40) are compounded for 10 minutes under a nitrogen atmosphere in a Brabender W50 mixer (46 rpm) heated to 200° C. The additives (Table 1) are introduced into the mixer right at the beginning together with the plastic mixture. After 10 minutes, the mixing is terminated, and the polymer composition is removed from the mixer and pre-pressed at 30° C. for 1 minute at approx. 50 kN.

From this compact, sheets with a thickness of 2 mm are produced at 200° C./50 kN. Dumbbell-shaped test specimens are stamped therefrom. These specimens are subjected to oven ageing at 80° C. until they become brittle (flexural test).

The comparative example is carried out analogously.

TABLE 1

| | % | Additive | Time before embrittlement [d] |
|---|---|---|---|
| Comp. 1 | — | none | 15 |
| Ex. 1 | 0.20 | Ch. 966 | 19 |
| Ex. 2 | 0.40 | Ch. 966 | 21 |

The samples stabilized in accordance with the invention exhibit improved durability.

EXAMPLES 3 AND 4

36.6 g of HDPE recyclate are compounded for 10 minutes under a nitrogen atmosphere in a Brabender W50 mixer (46 rpm) heated to 200° C. The additives (Table 2) are introduced into the mixer right at the beginning together with the plastic. After 10 minutes, the mixing is terminated, and the polymer composition is removed from the mixer and pre-pressed at 30° C. for 1 minute at approx. 50 kN.

From this compact, sheets with a thickness of 2 mm are produced at 200° C./50 kN. Dumbbell-shaped test specimens are stamped therefrom. These specimens are subjected to oven ageing at 120° C. until they become brittle (flexural test).

The comparative example is carried out analogously.

TABLE 2

| | % | Additive | Time before embrittlement [d] |
|---|---|---|---|
| Comp. 1 | — | none | 67 |
| Ex. 1 | 0.20 | Ch. 966 | 106 |
| Ex. 2 | 0.40 | Ch. 966 | 138 |

The samples stabilized in accordance with the invention exhibit improved durability.

EXAMPLE 5

The experiments are carried out with a recycled plastic mixture having the composition 80% of PO, 15% of PS, 2% of PET and 3% of PVC.

39 g of the plastic mixture are compounded for 10 minutes in a Brabender W50 mixer (46 rpm) heated to 200° C. The additives (Table 3) are introduced into the mixer right at the beginning together with the plastic mixture. After 10 minutes, the mixing is terminated, and the polymer composition is removed from the mixer and pre-pressed at 30° C. for 1 minute at approx. 50 kN.

From this compact, sheets with a thickness of 2 mm are produced at 200° C./50 kN. Dumbbell-shaped test specimens are stamped therefrom. These specimens are subjected to oven ageing at 110° C. until they become brittle (flexural test).

The comparative examples are carried out analogously.

TABLE 3

| | % | Additive | Time before embrittlement [d] |
|---|---|---|---|
| Comp. 3 | — | none | 4 |
| Comp. 4 | 0.04/0.04/0.12 | AO-1/P-1/M-1 | 30 |
| Ex. 5 | 0.04/0.04/0.12/ 0.20 | AO-1/P-1/M-1/ Ch.966 | 50 |

The sample stabilized in accordance with the invention exhibits improved durability.

EXAMPLES 6–12

HDPE recyclate is premixed with the additives (Tables 4 and 5) and then homogenized at a maximum of 240° C. and 100 rpm with the aid of a twin-screw compounder (ZSK 25). Dumbbell-shaped test specimens are then produced by injection moulding.

These specimens are subjected to oven ageing at 120° C. After 2000 hours, the residual impact strength is determined (DIN 53 448) (Table 4).

The comparative examples are carried out analogously.

TABLE 4

| | | | Residual impact strength [%] | |
|---|---|---|---|---|
| | | Additive | Start | 2000 h |
| Comp.5 | — | none | 100 | 9 |
| Ex. 6 | 0.20 | Ch. 966 | 100 | 84 |
| Ex. 7 | 0.2/0.12/ 0.04/0.04 | Ch. 966/M-1/AO-2/ P-1 | 100 | 96 |

The samples stabilized in accordance with the invention exhibit better residual impact strength than the comparative example.

The dumbbell-shaped test specimens described above are subjected in a further test to artificial weathering in a Weather-O-Meter WOM Ci 65 at a BPT (black panel temperature) of 63° C. and a relative humidity RH of 60%. After weathering for the indicated number of hours, the impact strength is determined (DIN 53 448) (Table 5).

TABLE 5

| | | | Impact strength [kJ/m²] | | | |
|---|---|---|---|---|---|---|
| | % | Additive | Start | 2000 h | 5000 h | 7000 h |
| Comp.6 | — | none | 344 | 270 | 252 | 217 |
| Ex. 8 | 0.20 | Ch. 966 | 370 | 369 | 343 | 330 |
| Ex. 9 | 0.2/0.12/ 0.04/0.04 | Ch. 966/M-1/ AO-2/P-1 | 361 | 355 | 343 | 344 |
| Ex. 10 | 0.1/0.1 | Ch. 966/T.622 | 355 | 363 | 344 | 369 |
| Ex. 11 | 0.2/0.2 | Ch. 966/T.770 | 376 | 376 | 377 | 359 |
| Ex. 12 | 0.2/0.2 | Ch. 966/T.326 | 366 | 357 | 344 | 356 |

The samples stabilized in accordance with the invention exhibit better impact strength than the comparative example.

EXAMPLES 13

A recycled plastic mixture (64% of HDPE/22% of LDPE and 14% of PP) is premixed with the additives (Table 6) and then homogenized at a maximum of 240° C. and 100 rpm with the aid of a twin-screw compounder (ZSK 25). Dumbbell-shaped test specimens are then produced by injection moulding.

These specimens are subjected to oven ageing at 120° C. After 3000 hours, the impact strength is determined (DIN 53 448) (Table 6).

The comparative examples are carried out analogously.

TABLE 6

|  | % | Additive | Residual impact strength [%] | |
|---|---|---|---|---|
|  |  |  | 500 h | 3000 h |
| Comp.7 | 0.8 | Carbon black | 100 | 6 |
| Ex. 13 | 0.8/0.40/0.02/ 0.08/0.05/0.05 | Carbon black/Ch.966/M-1/ M-2/AO-2/P-1 | 100 | 70 |

The samples stabilized in accordance with the invention exhibit better residual impact strength than the comparative examples.

EXAMPLES 14 AND 15

A recycled plastic mixture (64% of HDPE/22% of LDPE and 14% of PP) is premixed with the additives (Table 7) and then homogenized at a maximum of 240° C. and 100 rpm with the aid of a twin-screw compounder (ZSK 25). Dumbbell-shaped test specimens are then produced by injection moulding.

These specimens are subjected to artificial weathering in a Weather-O-Meter WOM Ci 65 at a BPT of 63° C. and a relative humidity RH of 60%. After 2000 hours, the residual impact strength is determined (DIN 53 448) (Table 7).

The comparative examples are carried out analogously.

TABLE 7

|  | % | Additive | Residual impact strength [%] | |
|---|---|---|---|---|
|  |  |  | 0 h | 2000 h |
| Comp. 8 | 0.2 | Carbon black | 100 | 79 |
| Ex. 14 | 0.8/0.40/0.02/ 0.08/0.05/0.05 | Carbon black/Ch.966/M-1/ M-2/AO-2/P-1 | 100 | 92 |
| Ex. 15 | 0.8/0.40/0.02/ 0.08/0.05/0.05 | Carbon black/Ch. 966/M-1/ M-2/AO-2/P-1 | 100 | 103 |

The samples stabilized in accordance with the invention exhibit better residual impact strength than the comparative example.

EXAMPLES 16-19

A recycled plastic mixture (95% of PE/5% of PP) is premixed with the additives (Table 8) and then homogenized at a maximum of 240° C. and 30 rpm with the aid of a single-screw compounder. Dumbbell-shaped test specimens are then produced by injection moulding.

These specimens are additionally subjected to artificial weathering in a Weather-O-Meter Atlas Ci 65 A at a BPT of 63° C. and a relative humidity RH of 60%. After weathering for the stated number of hours, the residual impact strength is determined (DIN 53 448) (Table 8).

The comparative examples are carried out analogously.

TABLE 8

|  | % | Additive | Residual impact strength [%] | | | | |
|---|---|---|---|---|---|---|---|
|  |  |  | Start | 1000 h | 2000 h | 5000 h | 6500 h |
| Comp. 9 | — | No additive | 100 | 73 | 55 | 55 | 35 |
| Ex. 16 | 0.05/0.05/0.10/ 0.20 | AO-2/P-1/M-1 Ch. 966 | 100 | 88 | 81 | 73 | 77 |
| Ex. 17 | 0.05/0.05/0.10/ 0.10/0.10 | AO-2/P-1/M-1 Ch. 966/T.622 | 100 | 90 | 75 | 77 | 79 |
| Ex. 18 | 0.05/0.05/0.10/ 0.10/0.10 | AO-2/P-1/M-1 Ch. 966/T.770 | 100 | 88 | 76 | 82 | 85 |
| Ex. 19 | 0.40/0.30/0.30 | M-1/Ch. 966/ T.326 | 100 | 93 | 72 | 84 | 81 |

The samples stabilized in accordance with the invention exhibit better residual impact strength than the comparative example.

Compounds and abbreviations used in the examples:

Ch. 966: Mixture of the compounds

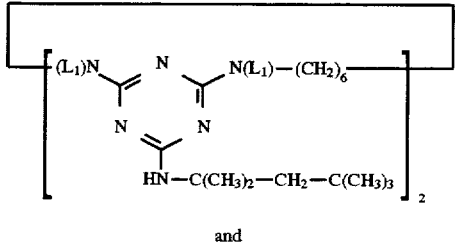

and

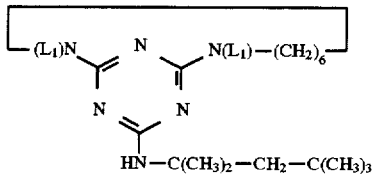

where $L_1$ is

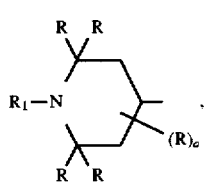

R is —$CH_3$, $R_1$ is H and a=0
in a ratio of 7:3.

AO-1: Octadecyl ester of β-(3,5-di-tert-butyl-4-hydroxyphenyl)propionic acid

AO-2: Pentaerythrityl ester of β-(3,5-di-tert-butyl-4-hydroxyphenyl)propionic acid M-1: Calcium stearate M-2: Calcium oxide P-1: Tris(2,4-di-tert-butylphenyl) phosphite T.622: Poly(N-β-hydroxyethyl-2,2,6,6-tetramethyl-4-hydroxypiperidinylsuccinic ester)

T.770: Bis(2,2,6,6-tetramethyl-4-piperidyl) sebacate

T.326: 2-(3'-tert-Butyl-2'-hydroxy-5'-methylphenyl)-5-chlorobenzotriazole

HDPE: High-density polyethylene
LDPE: Low-density polyethylene
PO: Polyolefin
PE: Polyethylene
PP: Polypropylene
PS: Polystyrene
PET: Polyethylene terephthalate
PVC: Polyvinyl chloride

What is claimed is:

1. A stabilized recycled plastic, which can be obtained from domestic, commercial and industrial waste or valuable material collections, comprising from 0.01 to 5% by weight, based on the plastic, of at least one macrocyclic compound of the formula

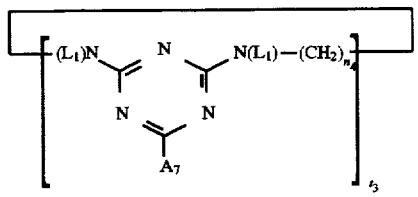
(VII)

where $L_1$ is the radical

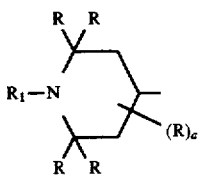
(Ia)

and $A_7$ is —$NR_4R_6$;

R is methyl;

$R_1$ is hydrogen, oxygen, hydroxyl, $C_1$–$C_{12}$alkyl, $C_3$–$C_8$alkenyl, phenyl-$C_1$–$C_6$alkyl, $C_1$–$C_{18}$alkoxy, $C_3$–$C_5$alkenoyl or $C_1$–$C_{18}$alkanoyloxy;

$R_4$ is hydrogen, $C_1$–$C_{12}$alkyl or, together with $R_6$, —$(CH_2)_2$—O—$(CH_2)_2$—;

$R_5$ is $C_1$–$C_{18}$alkyl;

$R_6$ is $C_1$–$C_{18}$alkyl, $C_3$–$C_{18}$alkenyl, $C_5$–$C_{18}$cycloalkyl, substituted or unsubstituted phenyl, substitute or unsubstituted phenyl-$C_1$–$C_6$alkyl, —$CH_2$—C(=O)—O—$R_5$ or, together with $R_4$, —$(CH_2)_2$—O—$(CH_2)_2$—;

a is the number 0, 1 or 2;

$n_4$ is a number from 1 to 12; and $t_3$ is a number from 1 to 4.

2. A stabilized recycled plastic according to claim 1, wherein from 0.01 to 2% by weight of at least one sterically hindered phenol and/or from 0.01 to 2% by weight of at least one organic phosphite or phosphonite are additionally added to the recycled plastic.

3. A stabilized recycled plastic according to claim 1, wherein at least one sterically hindered phenol and at least one organic phosphite or phosphonite in a weight ratio of from 20:1 to 1:20 are additionally added to the recycled plastic.

4. A stabilized recycled plastic according to claim 1, wherein at least one metal soap or inorganic compound from the series consisting of metal oxides, metal hydroxides and metal carbonates is additionally added to the recycled plastic.

5. A stabilized recycled plastic according to claim 1, additionally comprising a filler.

6. A stabilized recycled plastic according to claim 1, additionally comprising carbon black.

7. A stabilized recycled plastic according to claim 1, wherein at least one compatibilizer is additionally added to the recycled plastic.

8. A stabilized recycled plastic according to claim 1, wherein a light stabilizer or UV absorber from the series consisting of the benzophenones, benzotriazoles, oxanilides and linear sterically hindered amines is additionally added to the recycled plastic.

9. A stabilized recycled plastic according to claim 1, additionally comprising a linear sterically hindered amine.

10. A stabilizer mixture comprising from 0.01 to 5 parts of a mixture of compounds VII-A and VII-B

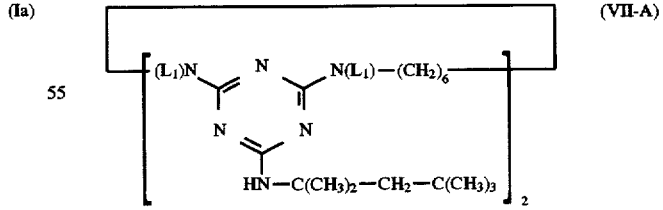
(VII-A)

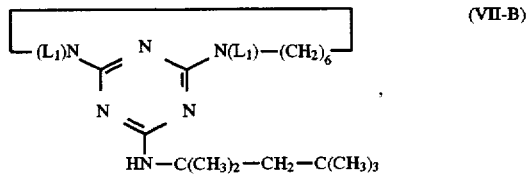
(VII-B)

where $L_1$ is

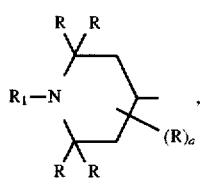

R is —$CH_3$, $R_1$ is H, and a is 0, in a ratio of from 10:1 to 1:10, from 0.01 to 2 parts of at least one sterically hindered phenol, from 0.01 to 2 parts of at least one organic phosphite or phosphonite and from 0.01 to 2 parts of at least one metal soap, metal oxide, linear sterically hindered amine or benzotriazole.

11. A stabilizer mixture comprising from 0.01 to 5 parts of a mixture of compounds VII-A and VII-B

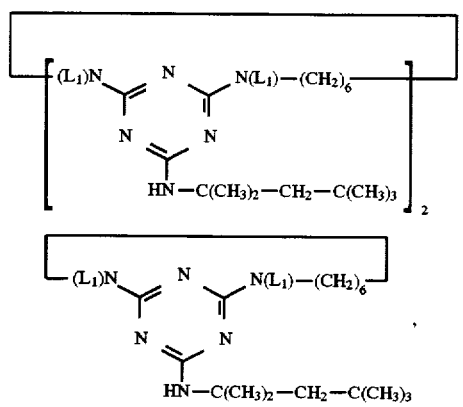

where $L_1$ is

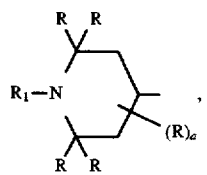

R is —$CH_3$, $R_1$ is H, and a is 0, in a ratio of from 10:1 to 1:10, and from 0.01 to 2 parts of at least one benzotriazole or benzophenone.

12. A stabilized recycled plastic according to claim 1, comprising from 0.01 to 5% by weight, based on the plastic, of a mixture of compounds VII-A and VII-B

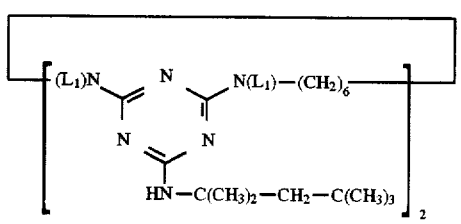

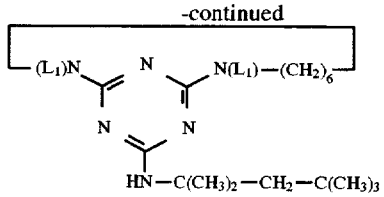

where $L_1$ is

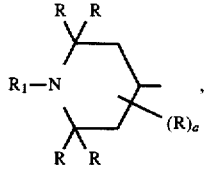

R is —$CH_3$, $R_1$ is H, and a is 0,
in a ratio of from 10:1 to 1:10.

13. A process for the stabilization of recycled plastics, which comprises adding to the plastic or plastic mixture from 0.01 to 5% by weight, based on the plastic, of at least one macrocyclic compound of the formula

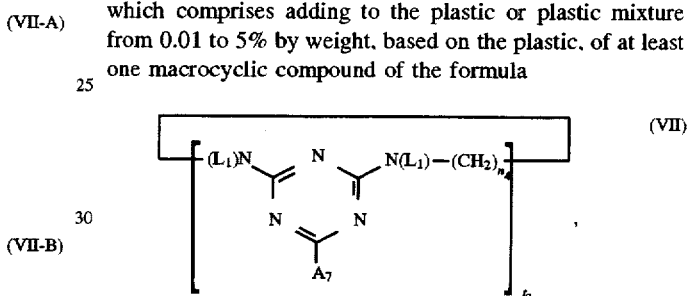

where $L_1$ is the radical

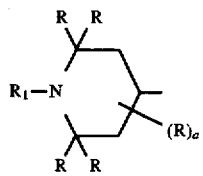

and $A_7$ is —$NR_4R_6$;

R is methyl;

$R_1$ is hydrogen, oxygen, hydroxyl, $C_1$–$C_{12}$alkyl, $C_3$–$C_8$alkenyl, phenyl—$C_1$–$C_6$alkyl, $C_1$–$C_{18}$alkoxy, $C_3$–$C_5$alkenoyl or $C_1$–$C_{18}$alkanoyloxy;

$R_4$ is hydrogen, $C_1$–$C_{12}$alkyl or, together with $R_6$, —$(CH_2)_2$—O—$(CH_2)_2$—;

$R_5$ is $C_1$–$C_{18}$alkyl;

$R_6$ is $C_1$–$C_{18}$alkyl, $C_3$–$C_{18}$alkenyl, $C_5$–$C_{18}$cycloalkyl, substituted or unsubstituted phenyl, substituted or unsubstituted phenyl—$C_1$–$C_6$alkyl, —$CH_2$—C(=O)—O—$R_5$ or, together with $R_4$, —$(CH_2)_2$—O—$(CH_2)_2$—;

a is the number 0, 1 or 2;

$n_4$ is a number from 1 to 12; and $t_3$ is a number from 1 to 4.

14. A process according to claim 13 for the stabilization of recycled plastics, which comprises adding to the plastic or plastic mixture from 0.01 to 5% by weight, based on the plastic, of a mixture of compounds VII-A and VII-B 31
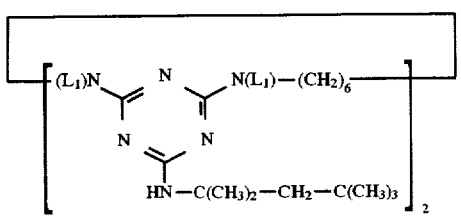
(VII-A)
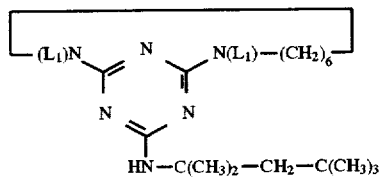
32
where $L_1$ is
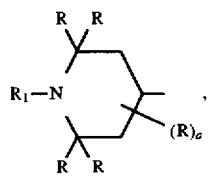
(VII-B)
R is —$CH_3$, $R_1$ is H, and a is 0,
in a ratio of from 10:1 to 1:10.
* * * * *

UNITED STATES PATENT AND TRADEMARK OFFICE
CERTIFICATE OF CORRECTION

PATENT NO. : 5,789,470
DATED : August 4, 1998
INVENTOR(S) : Heinz Herbst et al.

It is certified that error appears in the above-identified patent and that said Letters Patent is hereby corrected as shown below:

Title page, left column, section [75] should read:

-- [75] Inventors: Heinz Herbst, Lautertal; Kurt Hoffmann, Wachenheim, both of Germany; Franca Masina, Anzola Emilia, Italy; Rudolf Pfaendner, Rimbach, Germany; Franciszek Sitek, Therwil, Switzerland --.

Signed and Sealed this

Twenty-seventh Day of October, 1998

*Attest:*

BRUCE LEHMAN

*Attesting Officer*     *Commissioner of Patents and Trademarks*